Feb. 11, 1936.  E. H. RUCKLOS  2,030,321

DOUBLE ACTING GARDEN RAKE

Filed Oct. 24, 1934

INVENTOR

Edward H. Rucklos

Patented Feb. 11, 1936

2,030,321

UNITED STATES PATENT OFFICE 2,030,321

DOUBLE ACTING GARDEN RAKE

Edward H. Rucklos, Arcadia, Calif.

Application October 24, 1934, Serial No. 749,770

2 Claims. (Cl. 55—10)

The present invention resides primarily in the provision of a hand or garden rake which in addition to being constructed for use as and for all purposes of the ordinary rake, may be quickly and easily adjusted and thereby made suitable for a most efficient use, on both the pushing and pulling strokes thereof, as a ground leveling or ground cleaning implement without, in either of its latter uses, digging up the ground.

An object of the invention is to provide a rake, of the character described, wherein the head may be fixed in the usual position of the ordinary rake or be released to swing a predetermined extent with both rake strokes, pushing or pulling, and thereby accomplish the aforesaid purpose with a simple and inexpensive construction, highly efficient in use with a minimum of manual effort.

Another object is to provide a rake, such as described, which, when adjusted to permit the rake head to swing, will not, during the pulling stroke, dig up and carry the dirt toward the operator as the rake head automatically assumes the dirt clearing position. This automatic feature enhances the value of the implement by the fact that litter, such as paper, leaves and twigs, will be gathered without disturbing the ground or lawn surface. Further the advantages of this two-stroke action of the rake head is readily apparent when taking into consideration the action of the ordinary rake; the push stroke only of which does the leveling, inasmuch as the pull stroke, unless the rake is manually supported to lightly contact the surface to be leveled, will dig in and carry an excessive quantity of dirt toward the operator.

With the above and other objects in view the invention subsists in the novel construction and combination of parts hereinafter described, illustrated in the accompanying drawing, and set forth in the claims hereto appended, it being understood that various changes in form, proportion, size and minor details of construction within the scope of the claims may be resorted to without departing from the spirit or sacrificing any of the advantages of the invention.

Referring to the drawing.

Figure 1:
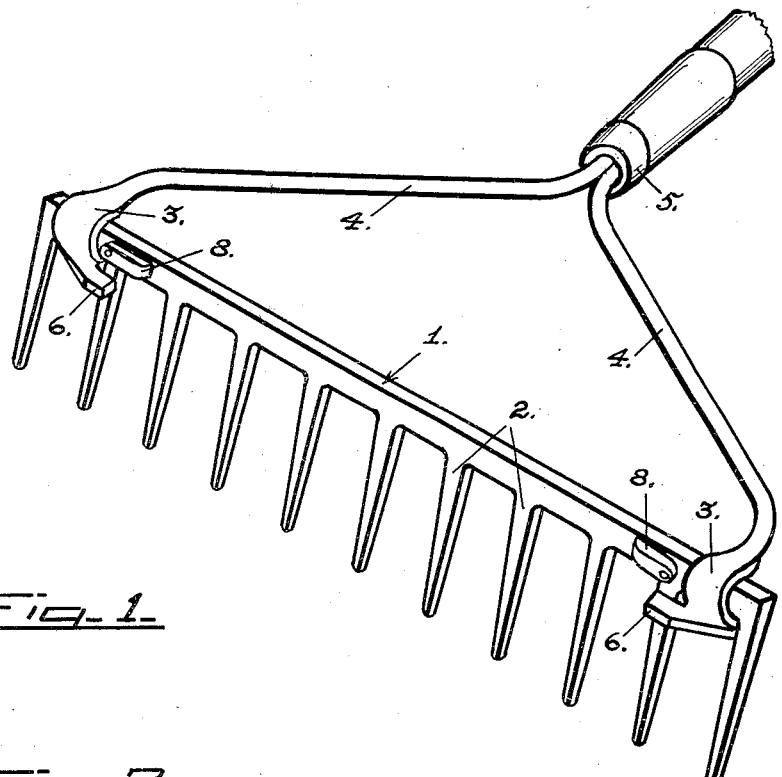
Figure 1 is a perspective view of the rake of my invention.

Referring to the embodiment of my invention shown in detail in the accompanying drawing it is seen that the rake comprises a rake head 1 having the usual teeth 2, and here arranged to turn freely in bearing eyes 3 formed in the ends of arms 4 which latter join the head to the usual handle 5.

Means are provided for fixing the rake head against movement out of position at right angles to the handle and when the head is in this position the rake is subject to use as and for all purposes of the ordinary rake. These adjustment and control means include the stop members 6 and 7 at each end of the head which are fixedly carried by eyes 3, and detent or latch members 8 pivoted at 9 on the rake head. When the latches are up, said latches being tightly pivoted to remain frictionally in position, the head will swing between the stops but when the latches are down they fit closely between the stops 6 and head and hold the latter against stops 7 whereby to fix the head in the usual right-angular relation to the handle, as in the ordinary rake. The purpose of locating the stops 6 and 7 forwardly and rearwardly of the rake head and below the plane of the latter is to provide for engagement of certain rake teeth with said stops in such manner as to effectively brace the entire head in both positions thereof.

The extent of movement permitted the head may be varied as desired but I have found that excellent results may be obtained by permitting the head to swing to an angle of approximately 67½ degrees to the ground level on pushing and pulling strokes of the rake, and as here shown the stops 6 and 7 are set accordingly.

Figures 2, 3:
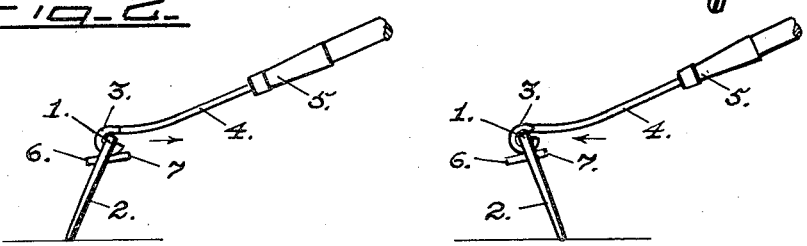
Figure 2 is a side elevation showing the rake when the head is free, with the latter in the pull stroke position.
Figure 3 is a view similar to Figure 2 with the rake head in the push stroke position.
Figure 4:
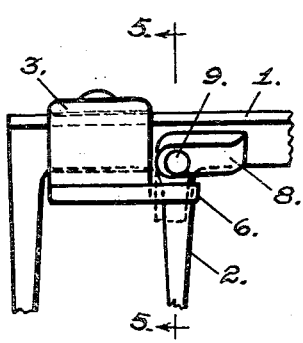
Figure 4 is an enlarged fragmentary front elevation showing the means controlling the rake-head movement and the means for locking the rake head in fixed position.
Figure 5:
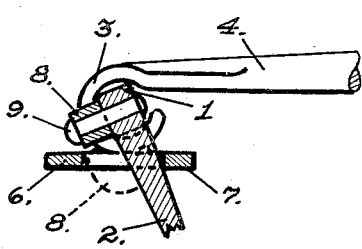
Figure 5 is a sectional view taken on the plane of line 5—5 of Figure 4.

Assuming that it is desired to use the rake for leveling the ground after an ordinary raking operation or that loose dirt or other material in piles on the ground are to be leveled, then the operator raises the latches 8 and thereby frees the rake head. On now pushing the rake the head will swing to the angle and position shown in Figure 3 and the teeth will be presented at the same angle as when the ordinary fixed-head rake is pushed for ground leveling purposes. When at this angle the teeth slide over the ground and also act to push before them small quantities of loose dirt whereby to level the ground. In other words, the teeth do not dig into and rake or pile up mounds of dirt. On now pulling the rake back the head swings to the angle and position shown in Figure 2 and presents the teeth at the same angle as when pushing the rake whereby the same action obtains, and an effective leveling may be had without digging into and raking up the ground.

It will thus be seen that on the raking-in or pulling stroke; leaves, paper, etc., may be raked up without changing the contour of the ground or in the case of lawns or loose flower-beds disturbing the two latter to any extent.

It will now be apparent that the rake of my invention serves the purpose of several garden implements and accomplishes the purposes hereinbefore stated in a particularly efficacious manner.

I claim:

1. In a garden rake, a handle, arms extending outwardly from said handle, eyes at the outer ends of said arms, a rake head mounted to turn in either direction in said eyes, teeth depending from said head and stop members carried by each of said eyes below the plane and forwardly and rearwardly of said head and in position to be engaged by certain of said teeth to limit the turning of the rake head in either direction.

2. In a garden rake, a handle, arms extending outwardly from said handle, eyes at the outer ends of said arms, a rake head mounted to turn in either direction in said eyes, teeth depending from said head and stop members carried by each of said eyes below the plane and forwardly and rearwardly of said head and in position to be engaged by certain of said teeth to limit the turning of the rake head in either direction and latches pivoted on said rake head to swing into or out of position between said certain teeth and certain of said stop members to prevent turning movement of said head.

EDWARD H. RUCKLOS.